June 8, 1943.  C. H. COLLINS  2,321,281
TURNING TOOL
Filed July 24, 1940  2 Sheets-Sheet 2
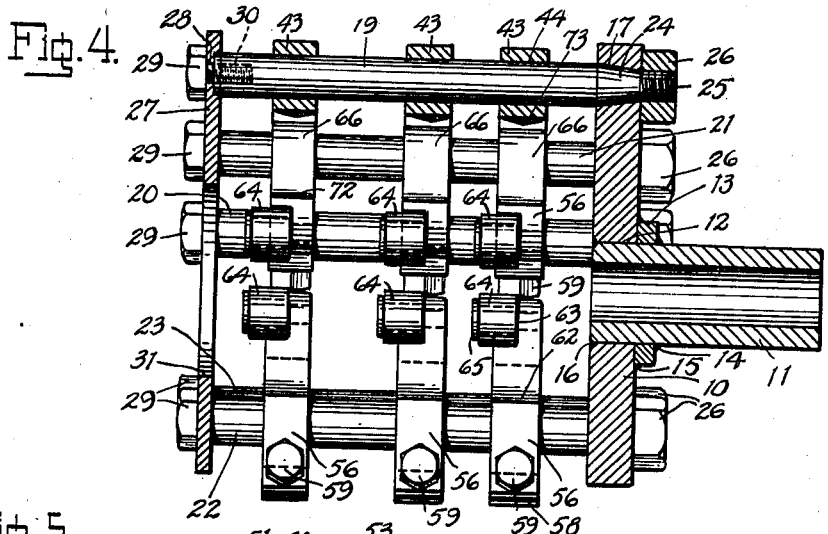
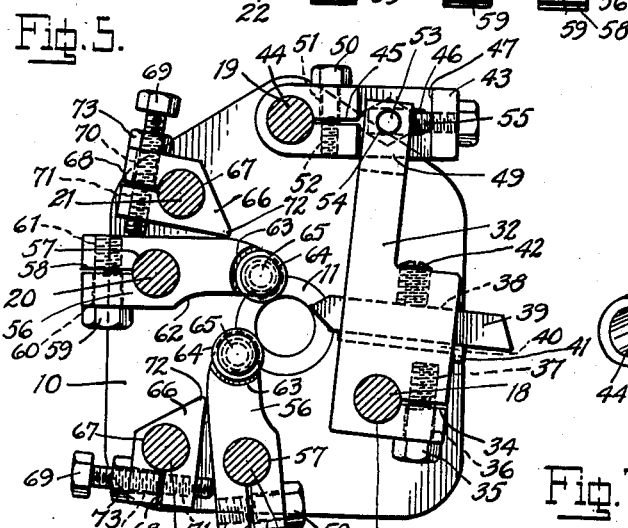
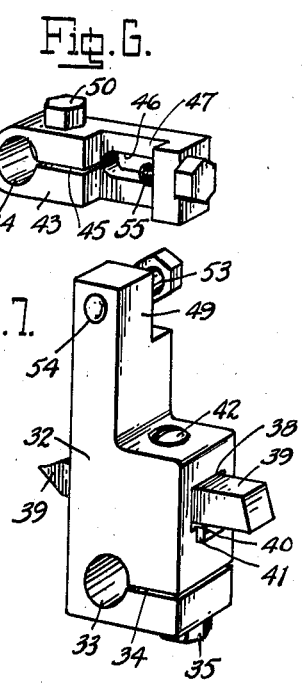
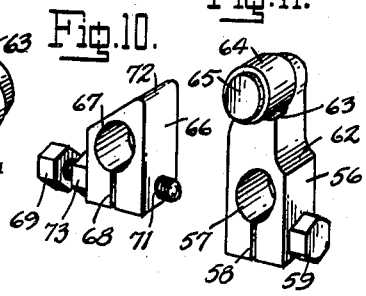
INVENTOR
CHARLES H. COLLINS
BY
ATTORNEYS Patented June 8, 1943

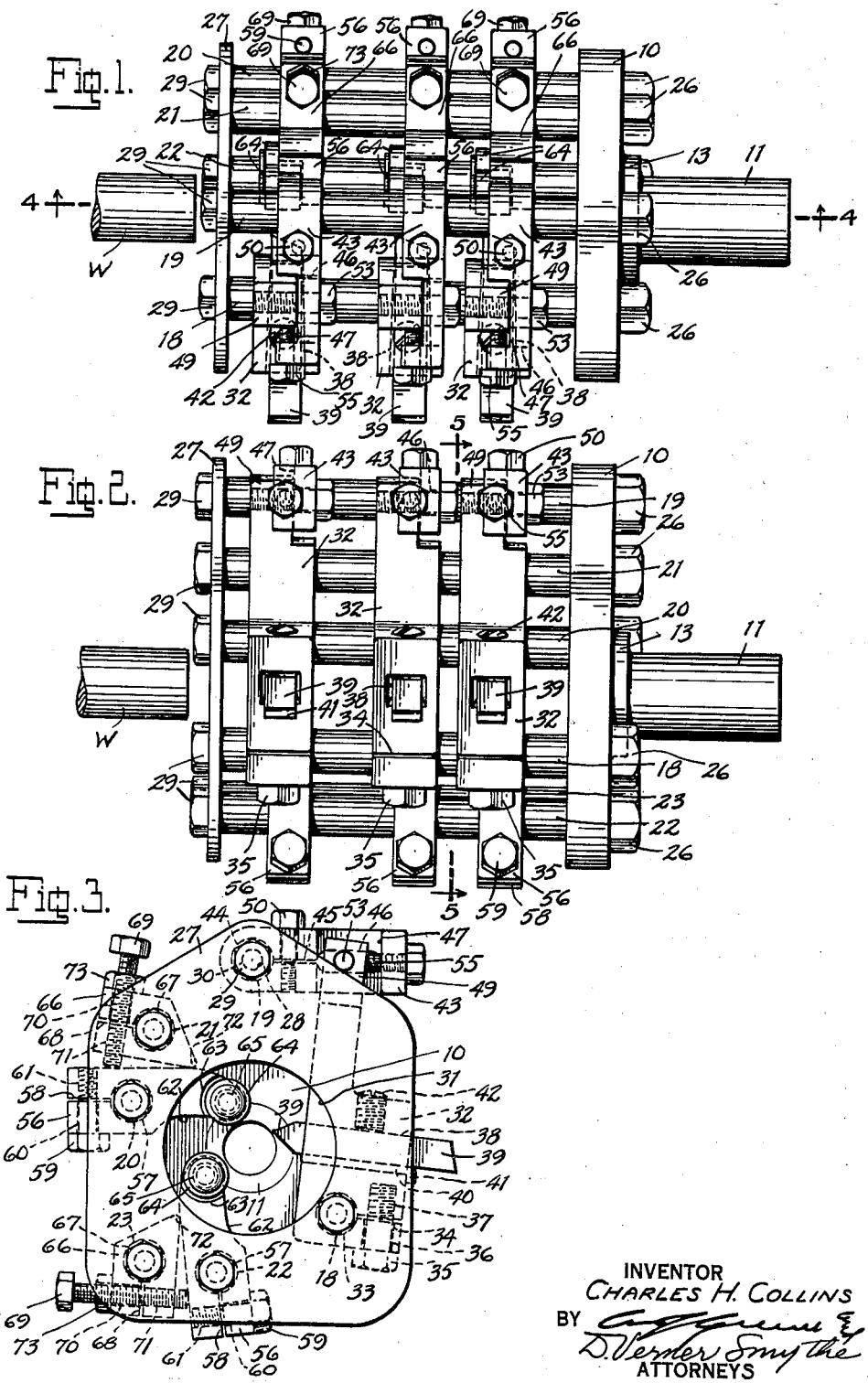

2,321,281

UNITED STATES PATENT OFFICE 2,321,281

TURNING TOOL

Charles H. Collins, Lebanon, Ohio, assignor to Remington Arms Company, Inc., a corporation of Delaware Application July 24, 1940, Serial No. 347,101

9 Claims. (Cl. 82—35)

The present invention relates to a box turning tool, particularly for automatic screw machine, and has for an object to provide a tool of this character in which a plurality of cutting tools may be supported in relation to work supporting rests, so that a plurality of diameters may be turned simultaneously upon the work. It is especially proposed to provide a box turning tool in which the tool holders and work rests may be accurately adjusted, both as to the diameter of the work and the longitudinal spacing of the different diameter cuts, and which will positively retain such adjustment, so that when once adjusted the only variation in the diameters will be that caused by normal wear of the cutter bits.

A further object is to provide a box turning tool in which the frame supporting the tool holders and work rests is extremely rigid, so that vibration is reduced to a minimum, and further to provide such frame in the form of an open cage-like structure, to the end that the parts are conveniently accessible and rapid cooling of all the working parts is permitted which assures high operating speed and long life. A further object is to provide a box turning tool which enables the operator to use faster spindle speeds and coarser feeds, and thereby greatly increase and speed production with a minimum of time required for adjustment and grinding of cutter tools.

Another object is to provide a box turning tool in which the tool holders are readily accessible for angular and longitudinal adjustment and depth of cut, and further to provide tool holders which permit point grinding, decrease the tendency to follow-out-of-true stock, and permit ready adjustment of the cutter bits to eliminate wavy cuts. A further object is to provide a box turning tool in which a cutter bit may be brought into relatively close relation with the open work receiving end of the tool, thereby permitting turning within a relatively short distance of the work supporting collet.

A still further object is to provide a box turning tool in which the supporting frame consists of two end plates and a plurality of parallel shafts interlockingly supported between the plates, so that absolute parallelism is maintained between the several tool holders and work rests supported upon these shafts, the arrangement further permitting of a convenient and rapid longitudinal adjustment of the tool holders and work rests.

Another object is to provide backing up means for the work rests which permits convenient angular and longitudinal adjustment, and which in its operative relation constitutes an interlocked thrust receiving support which is positively locked against angular displacement.

With the above and other objects in view, an embodiment of the invention is shown in the accompanying drawings, and this embodiment will be hereinafter more fully described with reference thereto, and the invention will be finally pointed out in the claims.

In the drawings:

Fig. 1 is a top plan view of a box turning tool according to the exemplary illustrated embodiment of the invention.

Fig. 2 is a side elevation from the tool holder side.

Fig. 3 is an end elevation from the open work receiving end.

Fig. 4 is a longitudinal vertical sectional view, taken along the line 4—4 of Fig. 1.

Fig. 5 is a transverse vertical sectional view, taken along the line 5—5 of Fig. 2.

Fig. 6 is a perspective view of one of the tool holder thrust supports.

Fig. 7 is a perspective view of one of the tool holders.

Fig. 8 is a perspective view of one of the upper work rest backing elements.

Fig. 9 is a perspective view of one of the upper work rests.

Fig. 10 is a perspective view of one of the lower work rest backing elements.

Fig. 11 is a perspective view of one of the lower work rests.

Similar reference characters indicate corresponding parts throughout the several figures of the drawings.

The box turning tool according to the invention is designed to be used in an automatic screw machine which rotates the work in a suitable chuck provided in the head stock, the box turning tool being carried in a suitable turret, and adapted to be fed longitudinally into relation with the rotating work.

Referring to the drawings the box turning tool, according to the exemplary illustrated embodiment of the invention, comprises a back plate 10 of generally rectangular form, except at its upper edge which is inclined downwardly at each side of the center, and which is provided substantially centrally with a tubular post 11 engaged in a hole 12 therein, this post having a collar 13 engaged about it against the rearward face of the back plate, and these parts being rigidly secured together by welding, as at 14, 15 and 16. A plurality of tapered holes 17 is provided in the back plate, in which there are rigidly supported the several shafts 18, 19, 20, 21, 22 and 23, upon which are supported the several tool holders and their cooperating thrust supports, and the several upper and lower work rests and their cooperating backing elements, as will presently more fully appear. Each of the shafts is provided with a tapered end 24 engaged in the respective taper hole 17 of the back plate, and with a threaded stud 25 engaged by a nut 26 which rigidly secures the shaft to the back plate.

A face plate 27 corresponding in outline to the back plate 10 is secured to the forward ends of the shafts and for this purpose is provided with a plurality of holes 28 counter-bored at the rearward side of the plate, the ends of the shafts being seated in the counter-bores and being secured by cap screws 29 screwed into tapped holes 30 in the forward ends of the shafts. This arrangement secures the rigid relation of the several shafts so that their parallel relation is maintained and vibration is reduced to a minimum, and at the same time the face plate may be readily removed for the purpose of engaging or disengaging the tool holders and work rests when desired. The face plate is provided substantially centrally and in axial alignment with the post 11 with a relatively large entrance hole 31 through which the work, indicated by the letter W, is adapted to be engaged with the cutter-tools.

In the illustrated embodiment three sets of tool holders and work rests are illustrated in longitudinally spaced cooperative relation upon the supporting frame, and these are of identical form except for the positions of adjustment of the tool holders and work rests for cutting different diameters upon the work, it being understood that by relative longitudinal adjustment of the several sets of tool holders and work rests the extent of the different diameter cuts is determined, and that by angular and in and out adjustment the respective diameters of the several cuts is determined. Only one set of tool holders and work rests will be described in detail.

The tool holder 32 which is of generally L-shape is provided in its lower portion with a split collar structure consisting of a hole 33 having a radial split 34 extending therefrom to the rearward face of the tool holder, and which is clampingly secured upon the shaft 18 by means of a cap screw 35 engaged through a passage 36 at the lower side of the split collar structure and screwed into a tapped hole 37 at the upper side. This split collar structure securely fixes the position of the tool holder upon the shaft 18 while permitting it to be readily adjusted both longitudinally and angularly. A cutter bit receiving passage 38 is provided through the intermediate portion of the tool holder, its side walls being tapered toward the inner end, so that the cutter bit 39 engaged therein may have limited lateral angular adjustment, this being particularly for the purpose of eliminating wavy cuts. A lift bar 40 is engaged in the slot 38 beneath the cutter bit and is provided at its outer end with a downwardly bent lip 41 to limit its insertion in the slot. The cutter bit is secured in the slot by means of set-screw 42 engaged in the intermediate lateral shoulder portion of the holder, and bearing upon the upper surface of the bit, this set-screw being readily accessible from the outer side of the tool to permit of convenient removal or adjustment of the bit.

Upon the shaft 19 there is engaged for longitudinal and angular adjustment a thrust supporting member 43 for the tool holder, provided with a split collar structure at its inner end consisting of a hole 44 engaged by the shaft having a radial split 45 extending therefrom to a slot 46 provided in an intermediate recessed portion 47, the recess being formed upon the forward face of the supporting member and adapted to be adjustably engaged by the upper shouldered end portion 49 of the tool holder, and as will presently more fully appear. The thrust supporting member is secured to the shaft 19 by means of a cap screw 50 engaged through a passage 51 in the upper side of the split collar structure and screwed into a tapped hole 52 in the lower side. This split collar structure securely fixes the position of the support upon the shaft while permitting it to be readily adjusted longitudinally and angularly.

The end 49 of the tool holder is adjustably secured in the recess 47 by means of a cap screw 53, engaged through the slot 46 and screwed into a tapped hole 54 in the end 49, this arrangement permitting of angular adjustment of the tool holder about the shaft 18 to position the cutter bit in the proper angular or tangential relation with respect to the work. A cap screw 55 is engaged in the outer end of the thrust support and bears upon the outer surface of the end 49, so that the thrust produced upon the tool holder through the cutting operation, and which is in clockwise direction about the axis of the shaft 18, is taken by the cap screw 55 and transmitted through the thrust supporting member directly to the shaft 19.

Upon the shaft 20 there is supported for longitudinal and angular adjustment a roller work rest member 56 provided with a split collar structure at its outer end consisting of a hole 57 engaged by the shaft having a radial split 58 extending therefrom to the outer end of the member, this split collar structure being secured by means of a cap screw 59 engaged through a passage 60 at the lower side and screwed into a tapped hole 61 at the upper side. The inner end of the member 56 is cut away at its lower edge, as at 62, to effectually clear the work, and is provided with a recessed annular pocket 63 in which a roller 64 is rotatably supported upon a riveted bearing stud 65, this roller adapted to engage the work at an upper point upon its side opposite to the cutter tool.

Upon the shaft 21 there is engaged for longitudinal and angular adjustment an upper work rest backing element 66 provided with a split collar structure at its outer end consisting of a hole 67 engaged by the shaft having a radial split 68 extending therefrom to its outer end, this split collar structure being secured upon the shaft by means of an elongated cap screw 69 engaged through a passage 70 at the upper side and screwed through a tapped hole 71 at the lower side, where the end of the screw projects into engagement with the upper surface of the work rest member to wedgingly rotate the inner tapered and rounded bearing end portion 72 into engagement with the upper surface of the work rest member at a point relatively close to the roller end. The backing element is rigidly secured upon the shaft 21 by means of a nut 73 engaged upon the screw 69 between its head and the upper surface of the backing element. The work rest member with its cooperating backing element provides a rigid support for the work which may be readily adjusted to fit different diameters, and which when fixed in the adjusted position is positively locked against angular displacement, and thus the work is firmly and accurately supported and at the same time vibration is effectually eliminated. The backing element engages the work rest member to a point at one side of the axes of the shafts 20 and 21 and substantially in line with the thrust produced thereon by the work, and at the same time the engagement of the cap screw with the outer end of the work rest member at the other side of the axes of the shafts prevents any possibility of angular displacement of either the work rest member or the backing element.

Upon the shafts 22 and 23 there are respectively supported a lower work rest roller member 56 and the backing element 66 therefor, which are exact duplications of the corresponding parts mounted upon the shafts 20 and 21, the position of the lower work rest member 56 being substantially vertical as compared to the substantially horizontal position of the upper work rest member, and the roller engaging the work at a lower point upon its side opposite to the cutter tool.

It will be observed that the shafts 18 and 19 are rigidly connected as a pair by the interlocking connection between the tool holder 32 and thrust support member 47, and that the shafts 20 and 21, and 22 and 23, are also connected as pairs by the rigidly connected work rest members 56 and backing elements 66, this rigid connection of the shafts in pairs giving to the frame structure a maximum rigidity and support against vibration.

The form of the invention illustrated in the drawing and described herein is typical and illustrative only, and it is evident that the invention is capable of embodiments in other forms, all falling within the scope of the appended claims, which are to be broadly construed.

What is claimed is:

1. In a box turning tool, a frame comprising a mounting back portion, a face portion longitudinally spaced therefrom having an opening for receiving work, and a plurality of spaced parallel supporting portions extending between said back and face portions, a tool holder mounted upon one of said supporting portions for longitudinal and angular adjustment movement thereon, a thrust supporting member for said tool holder mounted upon another of said supporting portions for longitudinal and angular adjustment movement thereon, means for interlockingly connecting said thrust supporting member to said tool holder, and work rest means mounted upon still another of said supporting portions for longitudinal and angular adjustment movement thereon.

2. In a box turning tool, a frame comprising a mounting back portion, a face portion longitudinally spaced therefrom having an opening for receiving work, and a plurality of spaced parallel supporting portions extending between said back and face portions, and a plurality of sets of work engaging means mounted upon said parallel supporting portions for relative longitudinal and angular adjustment thereon, each of said sets comprising tool holder means mounted upon certain of said supporting portions, work rest means mounted upon other of said supporting portions, and thrust receiving means mounted upon still other of said supporting portions cooperatively engaged at at least two points with said work rest means to prevent relative angular movement.

3. In a box turning tool, a frame comprising a mounting back portion, a face portion longitudinally spaced therefrom having an opening for receiving work, and a plurality of spaced parallel supporting portions extending between said back and face portions, and a plurality of sets of work engaging means mounted upon said parallel supporting portions for relative longitudinal and angular adjustment thereon, each of said sets comprising tool holder means mounted upon certain of said supporting portions, work rest means mounted upon other of said supporting portions, and thrust receiving means mounted upon still other of said supporting portions cooperatively and adjustably engaged at at least two points with said work rest means to normally prevent relative angular movement and through adjustment to permit relative angular movement.

4. In a box turning tool, a frame comprising a mounting back portion, a face portion longitudinally spaced therefrom having an opening for receiving work, and a plurality of spaced parallel shaft members secured to and extending between said back and face portions, a tool holder mounted upon one of said shaft members for longitudinal and angular adjustment movement thereon, a thrust supporting member for said tool holder mounted upon another of said supporting members for longitudinal and angular adjustment movement thereon and interlockingly connected to said tool holder, a work rest member mounted upon still another of said shaft members for longitudinal and angular adjustment thereon, a work rest backing member mounted upon still another of said shaft members for longitudinal and angular adjustment thereon and engaged with said work rest member, a second work rest member mounted upon still another of said shaft members for longitudinal and angular adjustment movement thereon, and a second work rest backing member mounted upon still another of said shaft members for longitudinal and angular adjustment movement thereon and engaged with said second work rest member, said work rest members adapted to engage the work at spaced points at the opposite side thereof from said tool holder.

5. In a box turning tool, a frame comprising a mounting back portion, a face portion longitudinally spaced therefrom having an opening for receiving work, and a plurality of spaced parallel supporting portions extending between said back and face portions, a tool holder mounted upon one of said supporting portions for longitudinal and angular adjustment movement thereon, a thrust support member for said tool holder mounted upon another of said supporting portions for longitudinal and angular adjustment movement thereon having a tool holder securing portion engaged by said tool holder for relative angular adjustment, and a thrust receiving portion engaging said tool holder at its outer side whereby outward thrust upon said tool holder is received by said thrust support member and transmitted to said supporting portion of said frame.

6. In a box turning tool, a frame comprising a mounting back portion, a face portion longitudinally spaced therefrom having an opening for receiving work, and a plurality of spaced parallel supporting portions extending between said back and face portions, a tool holder mounted upon one of said supporting portions for longitudinal and angular adjustment movement thereon, clamping means carried by said tool holder for securing it upon said supporting portion, a thrust support member for said tool holder mounted upon another of said supporting portions for longitudinal and angular adjustment movement thereon having a tool holder securing portion engaged by said tool holder for relative angular adjustment, a thrust receiving portion engaging said tool holder at its outer side whereby outward thrust upon said tool holder is received by said thrust support member and transmitted to said supporting portion of said frame, and clamping means for securing said thrust support member.

7. In a box turning tool, a frame comprising a mounting back portion, a face portion longitudinally spaced therefrom having an opening for receiving work, and a plurality of spaced parallel supporting portions extending between said back and face portions, a tool holder mounted upon one of said supporting portions, a work rest member mounted upon another of said supporting portions for angular adjustment movement thereon, and including arm portions projecting in opposite directions with respect to said supporting portion, a work rest backing-up member mounted upon still another of said supporting portions and including arm portions projecting in opposite directions with respect to said supporting portion, one of the projecting arm portions of said backing-up member engaging one of the projecting arm portions of said work rest member at one side of the axes of said supporting portions, and adjustable means engaged between said projecting arm portions of said work rest member and said backing-up member which extend in the other direction from said supporting portions, whereby relative angular movement of said work rest member and backing-up member is prevented, said adjustment means adapted upon adjustment to permit relative angular movement.

8. In a box turning tool, a frame comprising a mounting back portion, a face portion longitudinally spaced therefrom having an opening for receiving work, and a plurality of spaced parallel supporting portions extending between said back and face portions, a tool holder mounted upon one of said supporting portions, a work rest member mounted upon another of said supporting portions for angular adjustment movement thereon, and including arm portions projecting in opposite directions with respect to said supporting portion, a work rest backing-up member mounted upon still another of said supporting portions and including arm portions projecting in opposite directions with respect to said supporting portion, one of the projecting arm portions of said backing-up member engaging one of the projecting arm portions of said work rest member at one side of the axes of said supporting portions, and an adjustable screw engaged in said projecting arm portion of said backing-up member which extends in the other direction from said supporting portion and engaging the projecting arm portion of said work rest member which also extends in the other direction from said supporting portion, whereby relative angular movement of said tool rest member and backing-up member is prevented, adjustment of said screw adapted to adjust the relative angular positions of said work rest and backing-up members.

9. In a box turning tool, a frame comprising a mounting back portion, a face portion longitudinally spaced therefrom having an opening for receiving work, and a plurality of spaced parallel supporting portions extending between said back and face portions, a tool holder mounted upon one of said supporting portions for longitudinal and angular adjustment movement thereon, a thrust support member for said tool holder mounted upon another of said supporting portions, said tool holder having a tool receiving passage extending therethrough at a point between said supporting portion supporting it and said thrust support member, said passage having tapered sides whereby a tool engaged therein is adapted to have swinging lateral adjustment movement.

CHARLES H. COLLINS.